(12) United States Patent
Vergne et al.

(10) Patent No.: US 11,338,289 B2
(45) Date of Patent: May 24, 2022

(54) MICROFLUIDIC DEVICE

(71) Applicant: Fluigent, Le Kremlin-Bicêtre (FR)

(72) Inventors: Clémence Vergne, Paris (FR);
Benjamin Rouffet, Lagny-sur-Marne (FR); Lionel Matthys, Villejuif (FR); Robert Breton, Paris (FR); Nicolas Petit, Sceaux (FR)

(73) Assignee: FLUIGENT, Le Kremlin-Bicêtre (FR)

( * ) Notice: Subject to any disclaimer, the term of this patent is extended or adjusted under 35 U.S.C. 154(b) by 355 days.

(21) Appl. No.: 16/500,683

(22) PCT Filed: Mar. 29, 2018

(86) PCT No.: PCT/EP2018/058063
§ 371 (c)(1),
(2) Date: Oct. 3, 2019

(87) PCT Pub. No.: WO2018/184971
PCT Pub. Date: Oct. 11, 2018

(65) Prior Publication Data
US 2020/0188916 A1 Jun. 18, 2020

(30) Foreign Application Priority Data
Apr. 3, 2017 (FR) ...................................... 1752867

(51) Int. Cl.
*B01L 3/00* (2006.01)
*G05D 16/02* (2006.01)

(52) U.S. Cl.
CPC ..... *B01L 3/502738* (2013.01); *B01L 3/50273* (2013.01); *G05D 16/02* (2013.01); *B01L 2300/14* (2013.01); *B01L 2400/0487* (2013.01)

(58) Field of Classification Search
CPC ........... B01L 3/502738; B01L 3/50273; B01L 2300/14; B01L 2400/0487; G05D 16/02; G05D 16/204
See application file for complete search history.

(56) References Cited

U.S. PATENT DOCUMENTS

| | | | |
|---|---|---|---|
| 3,038,449 A | 6/1962 | Murphy, Jr. et al. | |
| 5,329,965 A | 7/1994 | Gordon | |
| 2006/0275179 A1* | 12/2006 | Viovy | B01L 3/502738 422/400 |

FOREIGN PATENT DOCUMENTS

| | | |
|---|---|---|
| CN | 102205522 A | 10/2011 |
| FR | 2855076 A1 | 11/2004 |

(Continued)

OTHER PUBLICATIONS

International Search Report issued in corresponding International Application No. PCT/EP2018/058063 dated Jun. 1, 2018 (3 pages).

(Continued)

*Primary Examiner* — Jennifer Wecker
*Assistant Examiner* — Oyeleye Alexander Alabi
(74) *Attorney, Agent, or Firm* — Osha Bergman Watanabe & Burton LLP (57) ABSTRACT

Microfluidic device comprising a tank (6) supplying a microchannel (2) with a first fluid (S), and a circuit (8) in which a flow of a second fluid can be established without contact with the microchannel (2). The circuit (8) passes through the tank (6) or is connected to the tank (6) by a pipe (30). The circuit (8) comprises a first on/off valve (12) mounted in parallel with a first proportional valve (11), these first valves (11, 12) being controllable so as to modify the pressure applied in the tank (6) to the first fluid (S) by the second fluid.

17 Claims, 3 Drawing Sheets

(56) References Cited

FOREIGN PATENT DOCUMENTS

| JP | H04145508 A | 5/1992 |
| JP | 2000 205204 A | 7/2000 |
| JP | 2009265859 A | 11/2009 |

OTHER PUBLICATIONS

Written Opinion issued in corresponding International Application No. PCT/EP2018/058063 dated Jun. 1, 2018 (8 pages).
Fluigent SA: "Flow-Rate Control Module (FRCM)", Sep. 28, 2016, XP055434466, Retrieved from internet:URL:http://www.fluigent.com/wp-content/uploads/2017/03/flyer_Flow-Rate-Control-Module.pdf (2 pages).
Office Action issued in corresponding CN Application No. 201880036902.7 with English translation dated Oct. 20, 2021 (15 pages).
Guo Jianye et al. "High Oil Pressure Turbine Governor" pp. 15-16, 58-60, Changjiang Publishing House, Apr. 30, 2007) with particle English translation (13 pages).

\* cited by examiner

MICROFLUIDIC DEVICE

TECHNICAL FIELD

The present disclosure relates to a microfluidic device.

Such a device can be used in technological fields such as the analysis of biological molecules or macromolecules, biotechnology, medical applications, chemical synthesis or microelectronics.

TECHNICAL BACKGROUND

In the above-mentioned technical fields, it is necessary to be able to handle and analyse product samples with a volume in the microlitre range or even smaller. The so-called "microfluidic" devices make it possible to work on precious and small volume samples, reduce the quantities of consumables (vehicles, markers, etc.) used, accelerate material or heat exchanges and reduce transport times. These devices generally comprise microchannels in which different operations can be automatically performed on a sample.

For example, a microfluidic diagnostic device allows, on a sample such as a drop of blood distributed in microchannels, to pre-treat the sample (e.g. cell lysis or DNA or protein extraction), possibly enrichment or separation (chromatography, electrophoresis), followed by the detection of predetermined molecules using optical type techniques (e.g. fluorescence, luminescence, plasmon resonance), electrical or electrochemical (e.g. conductivity, cyclic amperometry), or electronic (e.g. field effect transistors, biosensors, vibrating microblades).

Applications such as DNA analysis, cell sorting, synthesis of chemical compounds, purification or enrichment of a product with one or more species, heat transport actions for cooling or heating a component, nucleic acid amplification reactions, are possible with such microfluidic devices.

Examples of microfluidic devices are described in patent document FR 2855076. One of these examples, shown in FIG. 1 of the document, comprises a microchannel connected to a tank by a pipe. The tank is an enclosure containing a liquid product to be dispensed into the microchannel. A gas circuit passes through the tank. This circuit comprises, in the downstream direction, i.e. in the direction of gas flow, a pressure source (e.g. a pump or a pressurized gas bottle), an inlet branch connected to the pressure source, the tank and an outlet branch. A proportional electrovalve is located in the inlet branch to regulate the flow of gas from the pressure source into the tank. A needle valve is located in the outlet branch to control the flow of gas leaving the tank. By adjusting the opening of the valves, it is possible to establish a controlled gas flow in the tank. In particular, the solenoid valve is connected to a control system that controls the opening of the valve based on pressure information from a pressure sensor that measures the gas pressure in the tank. This makes it possible to dynamically control the gas pressure in the tank and to control the flow of the product through the microchannel, which depends on the pressure applied in the tank by the gas to the product.

Although generally satisfactory, such a system has certain disadvantages. In particular, it may be difficult to find a good compromise between a good pressure response dynamic, a good pressure stability, low air consumption (<1 L/min) and a low power consumption. The pressure response dynamic corresponds to the time required to reach the desired pressure, or set pressure, in the tank in the transient state (i.e. when changing the pressure set point). The shorter this time, the better the response dynamic. Pressure stability is the ability of the device to maintain constant pressure in the tank in the permanent state. To improve response dynamic, a proportional electrovalve should be selected with a maximum opening cross-section large enough to allow gas to enter the tank quickly and thus quickly reach the desired pressure. However, the larger the maximum opening cross-section of the electrovalve, the lower the resolution (or accuracy) of the electrovalve. In other words, the larger the maximum opening cross-section, the greater the minimum difference between two consecutive opening cross-sections. This makes it more difficult to accurately control the opening cross-section in the permanent state and reduces pressure stability. Conversely, a good resolution electrovalve has a small maximum opening cross-section, which affects the pressure response dynamic. It can therefore be understood how difficult it is to reach a satisfactory compromise between response dynamic and stability with such a device. In addition, the gas consumption of such a device can be relatively high, which means that the pump used as the pressure source must be oversized.

The aim of the invention is to remedy, at least partially, the above-mentioned drawbacks.

GENERAL OVERVIEW

The present disclosure relates to a microfluidic device comprising a tank supplying a microchannel with a first fluid, and a circuit in which a flow of a second fluid can be established without contact with the microchannel. The circuit passes through the tank or is connected to the tank by a pipe. The circuit consists of an on/off valve mounted in parallel with an proportional valve. These valves are controllable to change the pressure applied in the tank by the second fluid to the first fluid.

Typically, the first fluid is a liquid and the second fluid is a gas, although other combinations are possible.

"Microfluidic device" means a device involving the transport of a product within at least one microchannel. "Microchannel" means a channel, which has over at least a portion of its length a section with at least one dimension measured in a straight line from one edge to an opposite edge that is substantially less than one millimetre. A microchannel may have, for example, a surface-to-volume ratio significantly greater than 1 $mm^{-1}$, preferably greater than 4 $mm^{-1}$, for example greater than 10 $mm^{-1}$, or even greater than 1 $\mu m^{-1}$. In the present disclosure, the term "microchannel" also comprises channels called "nanochannel", "microfluidic channel", "mesochannel" and "mesofluidic channel". A microchannel may or may not have a constant cross-section. This section can, for example, be circular, rectangular, square or basin-shaped. When the section is rectangular, the microchannel may, for example, have a thickness between 10 μm and 100 μm and a width between 20 μm and 1 mm, including a width between 20 μm and 500 μm. For example, the microchannel may have a length of between 1 mm and 50 cm, in particular between 1 cm and 10 cm, for example 2 cm.

A "tank" is a closed enclosure capable of containing the first and second fluids under pressure. In addition to the microchannel that opens into the tank, either the circuit comprises two branches that open directly into the tank, or the circuit is connected to the tank through a pipe that opens into the tank.

A "proportional valve" is a valve that can be opened with more or less amplitude between its maximum closing position and its maximum opening position. In other words, the opening cross-section of a proportional valve can vary substantially continuously between a minimum opening cross-section and a maximum opening cross-section. In contrast, an on/off valve can only take two positions: an open position in which its opening cross-section is maximum and a closed position in which its opening cross-section is minimum and generally zero. An on/off valve is also called an "all or nothing valve".

The proportional valve and the on/off valve can be controlled electrically (in this case the valves are electrovalves), pneumatically or hydraulically by a control system. The control system can, for example, control the opening of the valves based on pressure information from a pressure sensor measuring the pressure of the second fluid in the tank. Examples of valve control systems and processes will be described in greater details below.

The on/off valve is mounted in parallel (or in bypass) with the proportional valve. Such an arrangement allows, in the transient state, to open the on/off valve and, in the permanent state, to open the proportional valve and close the on/off valve.

It then becomes possible to choose an on/off valve with a large maximum opening cross-section to allow the gas to pass quickly through in the transient state and thus improve the pressure response dynamic of the device. The pressure response dynamic is even better when the response time of an on/off valve is greater than that of an proportional valve (i.e. an on/off valve opens and closes faster than an proportional valve in response to a control signal).

It also becomes possible to choose the maximum opening section of the proportional valve smaller than the maximum opening section of the on/off valve. This provides a proportional valve with a good resolution and thus improves the pressure stability of the device in the permanent state. The microfluidic device thus presents, at the same time, a good dynamic pressure response and a good pressure stability for all types of volumes to be pressurized.

In particular, the maximum opening cross-section of the proportional valve may be less than 20%, in particular less than 5% and more particularly 3% of the maximum opening cross-section of the on/off valve. For example, when the valves have circular opening sections, the diameter of the maximum opening section of the proportional valve can be 0.2 mm (i.e. a maximum opening section of about 0.1 $mm^2$), whereas the diameter of the maximum opening section of the on/off valve can be 1 mm (i.e. a maximum opening section of about 3.1 $mm^2$).

In certain embodiments, the microfluidic device comprises a control system to control the on/off valve and the proportional valve to change the pressure applied in the tank by the second fluid to the first fluid so that this pressure reaches a set pressure, the control system being configured to, following a change in the set pressure:

in a first phase, open the on/off valve to quickly fill or empty the tank with a second fluid and quickly reach a pressure in the tank close to the set pressure, then close the on/off valve and control the proportional valve so that the pressure in the tank reaches and stays at the set pressure.

In addition, during the research leading to the invention, it was discovered that the high flow rate of the on/off valve could, in some cases, create undesirable pressure oscillations in the circuit, particularly when the on/off valve was closed. Also, in certain embodiments, to limit these oscillation phenomena, the microfluidic device comprises a system for damping the pressure oscillations induced by opening or closing the on/off valve.

In one example, the damping system consists of a porous open-pore material placed in the circuit in series with the on/off valve and in parallel with the proportional valve. In particular, it may be a porous polymeric material, a metallic foam or a porous ceramic material.

In another example, the damping system comprises a damper placed in a closed lateral branch of the circuit. A "damper" is a system comprising a part set in motion by the second fluid flowing in the closed lateral branch of the circuit, and means for absorbing the kinetic energy of the moving part. A "damper" is also referred to as a porous medium in which the second fluid can disperse.

In certain embodiments, the circuit comprises a first branch and a second branch located on either side of the tank, these two branches opening directly into the tank. Alternatively, when the circuit is connected to the tank by a pipe, it comprises a first and a second branch located on either side of the junction between the circuit and the pipe.

One of the first and second branches is an input branch and the other branch is an output branch. An on/off valve and a proportional valve can be mounted in parallel on the inlet branch to effectively control tank pressurization, on the outlet branch to effectively control tank depressurization, or on both branches to effectively control both tank pressurization and depressurization.

In certain embodiments, the first branch comprises the on/off valve and the proportional valve mounted in parallel, it being understood that the first branch may constitute the inlet or outlet branch of the second fluid.

In certain embodiments, the second branch comprises a narrowing, it being understood that the first branch may constitute the inlet or outlet branch of the second fluid. This narrowing can be a fixed opening or a variable opening one. It can be formed, for example, by a needle valve or an electrovalve. In particular, it can be formed by another proportional valve and this valve can be controlled by a regulation system. The proportional valve of the first branch and the proportional valve of the second branch can be identical.

In certain embodiments, at least the on/off valve and the proportional valve are controlled by a control system based on flow or pressure information. This information can be provided by a pressure or flow (or flow rate) sensor for liquid or gas, for example. The sensors can be placed in the microchannel, in the tank, in the first branch or in the second branch. Other types of sensors can be used, such as species or molecules detectors, fluorescence, electrochemical, absorption, plasmon resonance, cyclic amperometric, electronic, electrical or biosensor detectors. The regulation can also be done according to information retrieved by image analysis. This comprises observing the flow in a microchannel with a camera and controlling the valves based on the observed movements of the product in the microchannel.

The control system may comprise a processing unit, a control unit, an exchange unit, a memory and/or any other means to implement a control algorithm and to control the opening and closing of the valves accordingly.

In certain embodiments, all the valves (including the narrowing, when it is a valve) are controlled by the control system. This makes it possible to set up a high level of automation, for example to replace product samples and/or a separation matrix without human intervention, to carry out a series of operations such as separations, rinses, product changes, sample introductions, chemical reactions.

In certain embodiments, the microchannel is connected at each end to a tank, each tank being in communication with a circuit in which a flow of a fluid (different from the first fluid) can be established, without contact with the microchannel.

In certain embodiments, the microfluidic device comprises at least one tank and a plurality of microchannels, at least two of which are each connected at one end to a tank, each tank being in communication with a circuit in which a flow of a fluid (different from the fluids flowing through the microchannels) can be established, without contact with the microchannel, and at least one of the circuits is controllable so as to modify the pressure at the end of the associated microchannel. At least two of the above-mentioned microchannels can be connected to each other.

In certain embodiments, the second circuit comprises another on/off valve mounted in parallel with the narrowing. Such an installation allows, in a transient state, to open the on/off valve and, in a permanent state, to close the valve. It then becomes possible to choose an on/off valve with a large maximum opening cross-section to allow the gas to pass quickly through in the transient state and thus improve the pressure response dynamic of the device. It also becomes possible to choose the cross-section of the narrowing passage sufficiently small to limit, in the permanent state, the consumption of the device in second fluid. The microfluidic device thus provides both a good dynamic pressure response and a reduced consumption. In addition, when the narrowing is formed by a proportional valve, it is possible to choose a valve with a small cross-section and, therefore, a good resolution. This promotes the pressure stability of the device.

The present disclosure also relates to a control method for regulating the pressure of a first fluid in a microchannel, in which a microfluidic device is provided as described above, a second fluid is circulated in the circuit, and the on/off valve and proportional valve are controlled so as to change the pressure applied in the tank by the second fluid to the first fluid.

In particular, the on/off valve and the proportional valve are controlled so that, at least at the beginning of the transient state, the on/off valve is open and, in the permanent state, the on/off valve is closed and the proportional valve is open.

Thus, in certain embodiments of the method, following a change in the set pressure, in a first phase, the on/off valve is opened in order to quickly fill or empty the tank with a second fluid and quickly reach a pressure in the tank close to the set pressure, then the on/off valve is closed and the proportional valve is controlled so that the pressure in the tank reaches and stays at the set pressure.

In certain embodiments of the method, following the first phase, in a second phase, the on/off valve is closed and the proportional valve is fully opened to reach the set pressure, and in a third phase, the on/off valve remains closed and the opening of the proportional valve is used to stabilize the pressure in the tank. The first and second phases correspond, respectively, to the beginning and end of the transient state. The third phase corresponds to the permanent state.

The transient state refers to the phase after a change in the pressure set point, during which the pressure in the tank varies to reach a desired pressure (or the set point pressure). In other words, it is the phase during which the increase or decrease in pressure in the tank is significant. In contrast, the permanent state is the phase during which the pressure in the tank is substantially stable and equal to the desired pressure.

The aforementioned characteristics and advantages, in addition to others, will appear upon reading the following detailed description. This description refers to the appended drawings.

BRIEF DESCRIPTION OF THE DRAWINGS

The appended drawings are diagrammatic and are not to scale; their purpose is above all to illustrate the principles of the invention. In addition, the graphic symbols used to represent the different components of the microfluidic devices represented do not necessarily correspond to the standard symbols. These symbols do not therefore prejudge the nature or functioning of these components. To know the nature or functioning of these components, please refer to the detailed description below.

In these drawings, from one figure (FIG) to another, identical elements (or parts of elements) are identified by the same reference signs.

DETAILED DESCRIPTION OF EXAMPLE(S)

Exemplary embodiments are described in detail below, with reference to the appended drawings. These examples illustrate the characteristics and advantages of the invention. It should be remembered however that the invention is not limited to these examples.

Figure 1:
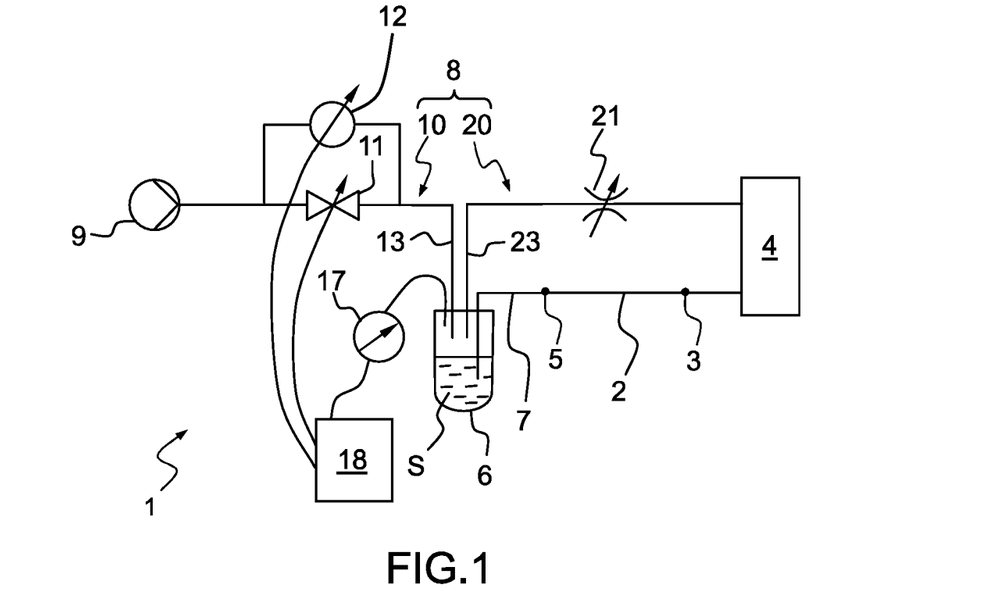
FIG. 1 diagrammatically and partially represents an example of a microfluidic device.

FIG. 1 represents a first example of a microfluidic device 1. The device 1 comprises a microchannel 2 connected at one end 3 to a pressure source 4 and at the other end 5 to a tank 6 by a pipe 7. The tank 6 contains a product S, which is a liquid in this example, to be distributed into the microchannel 2. The tank 6 communicates, on the one hand, with a pipe 13 belonging to a first branch 10, or input branch, of a circuit 8 and, on the other hand, with a pipe 23 belonging to a second branch 20, or output branch, of the circuit 8.

The first branch 10 is connected to a first pressure source 9. This pressure source 9 is, for example, a pump (as shown in FIG. 1) or a pressurized gas bottle (e.g. nitrogen) associated with a pressure reducing valve (not shown) to supply gas to the circuit 8 at a constant pressure P2. The second branch 20 is connected to a second pressure source 4 at a pressure P1. In the example, pressure P2 is higher than pressure P1. Alternatively, at least one of the branches 10 and 20 has a source of pressure or vacuum such as, for example, a gas chamber, pump or pressure regulator, and at least one of the branches 10 and 20 communicates with the ambient atmosphere. The atmosphere is also considered in this paper to be a source of pressure. Whatever the configuration chosen, it should be understood that a gas flow can be established in the circuit 8, this flow passing through the first branch 10, the tank 6 and the second branch 20. This flow does not pass through the microchannel 2. In the tank 6, there is an interface between the gas (i.e. an example of a second fluid according to the present disclosure) and the product S (i.e. an example of a first fluid according to the present disclosure) and the gas applies a pressure to the product S. The movement of the product S in the microchannel 2 depends on this pressure and the pressure P1.

A proportional valve 11 is located on the first branch 10 of the circuit 8 to regulate the gas flow rate from the pressure source 9. The first branch 10 of the circuit 8 also comprises an on/off valve 12 mounted in parallel with the proportional valve 11. These two valves 11, 12 are connected to a control system 18 allowing the opening of these valves to be controlled according to pressure information delivered by a pressure sensor 17 measuring the gas pressure in the tank 6. This makes it possible to dynamically control the gas pressure in the tank 6. The control system 18 can be designed to take into account other information, in particular information related to the flow of product S in the microchannel 2. The proportional valve 11 is, for example, an electrovalve electrically controlled by the control system 18.

A narrowing 21 is present in the second branch 20 of the circuit 8 to control the flow of gas leaving the tank 6. It can be a narrowing with a fixed or variable opening. When the narrowing 21 has a variable opening, this opening can be adjusted manually or controlled by the control system 18. In the example in FIG. 1, the narrowing 21 is formed by a needle valve whose opening can be adjusted manually.

By opening at least one of the valves 11, 12 and narrowing 21, it is possible to establish a gas flow in the first branch 10, the tank 6 and the second branch 20 of the circuit 8. The second branch 20 is a leak for the gas contained in the tank 6 and coming from the first branch 10. The flow rate of the product S in the microchannel 2 is adjustable by acting in particular on the pressure difference between the two ends 3, 5 of the microchannel 2. By analogy with electrical circuits, this pressure difference P can be linked to the flow rate I by the formula: $P = R \times I$ where R is called the microfluidic resistance. In the example considered, $R_C$ is the microfluidic resistance associated with the microchannel, Rf is the one associated with the second branch 20 and $R_e$ the one associated with the first branch 10. In the steady state, the flow rate $I_c$ in the channel is given by: $I_c = P_f/R_c$ where $Pf = P1 \cdot R_f R_c/(R_f R_c + R_e R_f + R_e R_c)$. It should be understood that it is possible to adjust this flow rate $I_c$ by varying the opening of the proportional valve 11, i. e. by varying the resistance $R_e$.

Regarding the regulation of the valves 11 and 12, this can be done as follows.

Following a change in the pressure set point. In a first phase, the on/off valve 12 is opened in order to quickly fill the tank 6 and reach a pressure close to the set pressure. In a second phase, the on/off valve 12 is closed and the proportional valve 11 is fully opened to reach the set point. In a third phase, the on/off valve 12 remains closed and the opening of the proportional valve 11 is used to stabilize the pressure in the tank by compensating for the pressure loss due to the leakage of the second fluid into the second branch 20 via the narrowing 21. The first and second phases correspond to a transient state, whereas the third phase corresponds to a permanent state of the system. The transition from one phase to the other may, for example, be determined by the difference between the set pressure and the pressure measured in the tank.

It should be noted that according to an alternative embodiment (not shown), the valves 11, 12 could be mounted on the second branch 20 of the circuit 8, whereas the narrowing 21 would be mounted on the first branch 10. In this case, in the first control phase, opening the on/off valve 12 would allow the tank 6 to be emptied (rather than filled) quickly.

Figure 2:
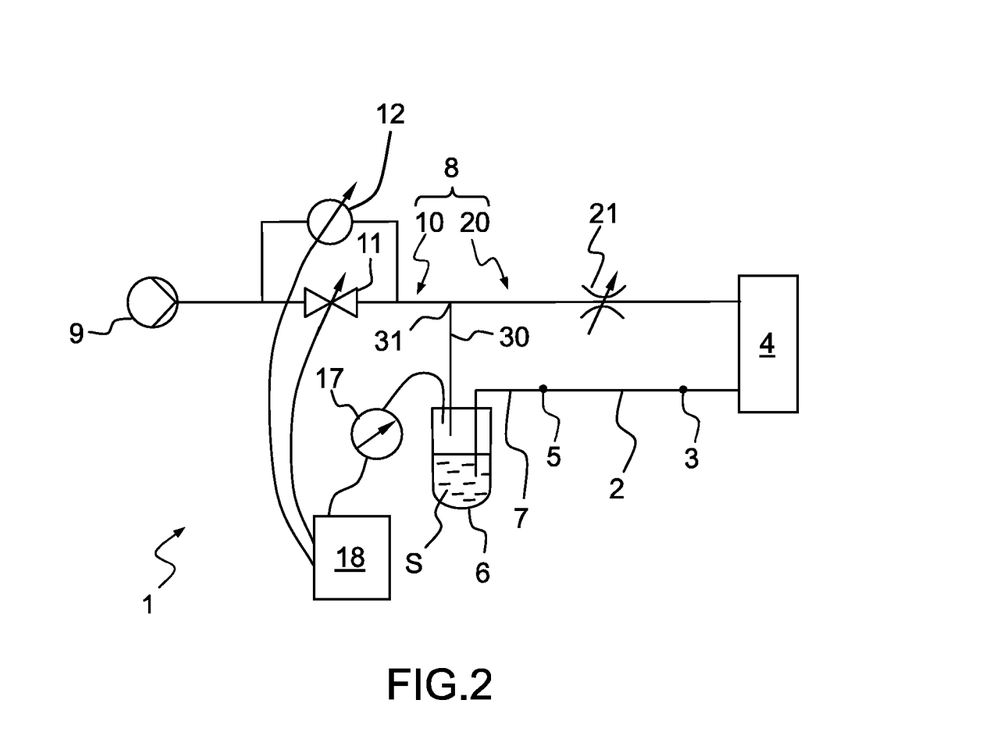
FIG. 2 diagrammatically and partially represents another example of a microfluidic device.

FIG. 2 shows a second exemplary embodiment of the microfluidic device 1. This example differs from that in FIG. 1 in that the circuit 8 is connected to the tank 6 through a single pipe 30. The circuit 8 then comprises a first branch 10 and a second branch 20 located on either side of the junction 31 between the circuit 8 and the pipe 30 leading to the tank 6. The circuit components in these two branches 10, 20 are identical with the components of the circuit 8 in the first and second branches 10, 20 of the circuit in FIG. 1. The regulation of the on/off valve 12 and the proportional valve 11 is carried out in the same way as described in the example of FIG. 1.

Figure 3:
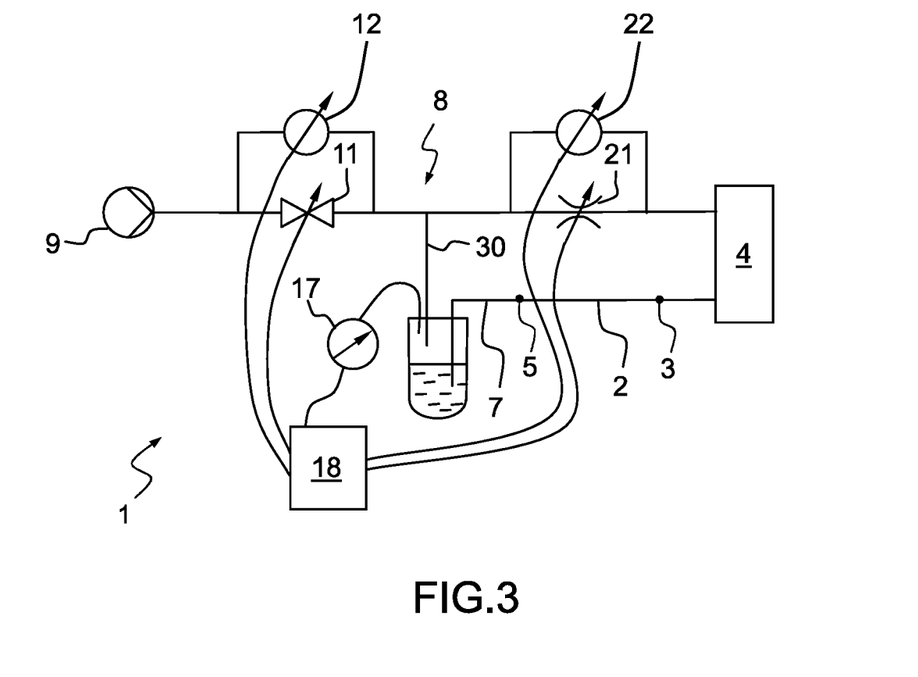
FIG. 3 diagrammatically and partially represents another example of a microfluidic device.

FIG. 3 shows a third example of a microfluidic device 1. This example differs from that of FIG. 2 in that another on/off valve 22 is mounted in parallel with the narrowing in the second branch 20 of the circuit 8. The on/off valve 22 can be identical with or similar to the on/off valve 12. Similarly, the narrowing can be formed by another proportional valve 21, identical with or similar to the proportional valve 11. For example, on/off valves 12, 22 have an opening diameter of 1 mm, whereas the proportional valves 11, 21 have a maximum opening diameter of 0.2 mm.

In the example, all the valves 11, 12, 21, 22 are controlled by the control system 18 and can be controlled as follows.

Following a change in the pressure set point, in a first phase, an analysis of the pressure difference between the pressure measured in the tank 6 by the sensor 17 and the set point can be used to determine whether the on/off valves 12, 22 should be activated or not. If the pressure difference is less than a predefined threshold pressure, the second phase is entered directly. If the pressure difference is greater than the threshold pressure, one of the two on/off valves 12, 22 opens until the pressure in the tank has reached a certain percentage of the set pressure. The threshold pressure can be a percentage of the maximum pressure value that the tank can reach, for example 20%. For example, in the case where the pressure in the tank has to be increased, the on/off valve 12 is opened so that the pressure in the tank 6 increases up to a certain percentage, e.g. 90% of the set pressure, with the other valves being closed. In case the pressure in the tank has to be reduced, the on/off valve 22 is opened so that the pressure in the tank 6 decreases to a certain percentage, e.g. 110% of the set pressure, with the other valves being closed. As soon as one of the two on/off valves 12, 22 is closed, the first phase is completed and a second phase is entered into.

At the start of the second phase, the pressure in the tank 6 is close to the set pressure. One of the proportional valves 11, 21 is open to the maximum to decrease the set point deviation as quickly as possible, the other valves being closed. The proportional valve 11 (21) then plays the same role as the on/off valve 12 (22) in the first phase but at a much lower flow rate (e.g. about 25 times lower) due to the size difference between the maximum opening cross-section of the proportional valve 11 (21) and the opening cross-section of the on/off valve 12 (22). As soon as the pressure in the tank 6 reaches the set pressure, the third phase is entered into.

At the start of the third phase, the set pressure is reached. In the third phase, the openings of the two proportional valves 11, 21 are used to compensate for the pressure loss or gain due to the flow of fluid exiting or entering the tank 6. The regulation is done, for example, by means of a "PID" (Proportional, Integrator, Diverter) regulator implementing a calculation algorithm that delivers a control signal from the difference between the set pressure and the measured pressure, in order to maintain the pressure in the tank 6 at the set pressure. Such a system has two degrees of freedom: the opening degrees of the two proportional valves 11, 21, and several combinations of valve openings are possible to obtain the same pressure. A combination is then preferably chosen to limit the consumption of the second fluid as much as possible. As both proportional valves 11, 21 have a good resolution (due to their limited maximum opening cross-sections), the number of possible combinations is greater than with valves of a poor resolution. This makes it possible to better limit the consumption of the second fluid.

Figure 4:
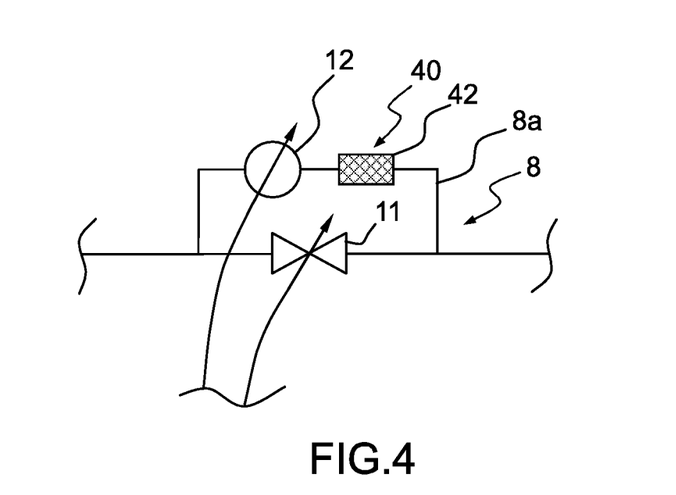
FIGS. 4 and 5 diagrammatic represent examples in which the microfluidic device is equipped with a pressure oscillation damping system.
Figure 5:
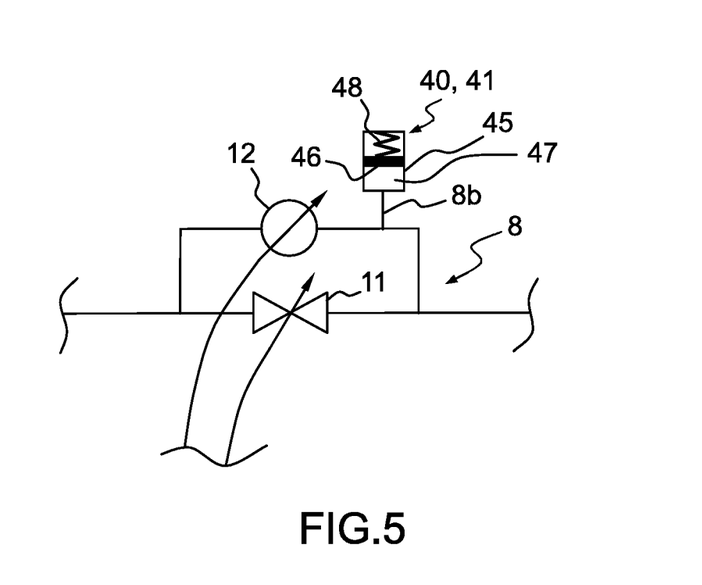

FIGS. 4 and 5 diagrammatically represent examples in which the microfluidic device 1 is equipped with a system 40 for damping pressure oscillations. In these examples, the damping system 40 is associated with the on/off valve 12 of the FIG. 1, 2 or 3. However, it could be associated with the on/off valve 22 of FIG. 3, or two damping systems 40 could be associated with the valves 12 and 22, respectively.

The high flow rate of the on/off valve 12 or 22 can, in some cases, create undesirable pressure oscillations in the circuit 8, especially when opening or closing the valve 12. To limit these oscillation phenomena, the microfluidic device 1 can be equipped with a system 40 for damping pressure oscillations.

In the example of FIG. 4, the damping system 40 comprises an open-pored porous material 42 placed in the circuit 8, between the on/off valve 12 and the tank 6. More precisely, the damping system 40 is placed in series with the on/off valve 12 and in parallel with the proportional valve 11. In other words, the damping system 40 is placed in the bypass portion 8a of the circuit 8 bypassing the proportional valve 11. The second fluid flowing in the bypass portion 8a thus passes through the porous material 42 and disperses into its pores. This dispersion makes it possible to dampen all or part of the pressure oscillations of the second fluid induced when opening or closing the on/off valve 12. In addition, when the on/off valve 12 is closed and the proportional valve 11 is open, the presence of the damping system 40 has no effect on the circulation of the second fluid in the circuit 8, the second fluid no longer flowing in the bypass portion 8a.

In the example of FIG. 5, the damping system 40 comprises a damper 41 placed in a closed side branch 8b of the circuit 8. One end of the side branch 8b is connected to the main branch of the circuit 8, which extends between the tank 6 and the valves 11, 12, and the opposite end of the side branch 8b is closed. The second fluid enters the lateral branch 8b through one end without being able to escape through the other end of this branch 8b. In the example shown diagrammatically in FIG. 5, the shock absorber 41 comprises a cylinder 45 inside which a moving part 46 moves. The movable part 46 separates the volume of the cylinder 45 into two chambers 47, 48 isolated from each other. A spring 48 or equivalent is placed in the second chamber 48. An orifice allows the second fluid flowing in the lateral branch 8b to enter the first chamber 47. The pressure of the second fluid in the chamber 47 pushes the moving part 46 towards the second chamber 48 and compresses the spring 48 which, in reaction, pushes the moving part 46 towards the first chamber 47. The combined action of the spring 48 and friction between the moving part 46 and the cylinder 45 dampens the movement of the part 46. Of course, other types of shock absorbers 41 could also be considered. For example, the spring 48 could be replaced by a compressible fluid, an elastic material, a membrane, etc. In addition, in the example of the FIG. 5, the lateral branch 8b is connected to the main branch of the circuit 8 downstream of the on/off valve 12, in the bypass portion of the circuit 8 bypassing the proportional valve 11. However, the lateral branch 8b could be connected to the main branch of the circuit 8 at other locations, without affecting the general operation of the microfluidic device 1 and the damping function of the system 40.

The examples or embodiments described in the present disclosure are provided by way of illustration and are non-restrictive; a person skilled in the art can easily, in the light of this document, modify these examples or embodiments, or contemplate others, while remaining within the scope of the invention.

Furthermore, the different characteristics of the examples or embodiments described in the present disclosure may be considered severally or combined with each other. When combined, these characteristics may be combined as described above or differently, the invention not being limited to the specific combinations described above. In particular, unless otherwise specified or technically incompatible, a characteristic described in relation to one mode or example of embodiment may be applied in a manner similar to another mode or example of embodiment.

The invention claimed is:

1. A microfluidic device comprising
   a tank supplying a microchannel with a first fluid and a circuit in which a flow of a second fluid can be established without contact with the microchannel,
   wherein the circuit passes through the tank (this limitation is interpreted as optional) or is connected to the tank by a pipe, and
   wherein the circuit comprises an on/off valve mounted in parallel with a proportional valve a maximum opening cross-section of the proportional valve being smaller than maximum opening cross-section of the on/off valve, wherein both the proportional and the on/off valves are configured to be controlled to modify a pressure applied in the tank to the first fluid by the second fluid.

2. A microfluidic device according to claim 1, comprising a control system for controlling the on/off valve and the proportional valve so as to modify the pressure applied in the tank by the second fluid to the first fluid so that this pressure reaches a set pressure, the control system being configured for, following a change in the set pressure:
   in a first phase, open the on/off valve to quickly fill or empty the tank with the second fluid and quickly reach a pressure in the tank close to the set pressure,
   then close the on/off valve and control the proportional valve so that the pressure in the tank reaches and stays at the set pressure.

3. A microfluidic device according to claim 1, wherein the maximum opening cross-section of the proportional valve is less than 20% of the maximum opening cross-section of the on/off valve.

4. A microfluidic device according to claim 1, comprising a system for damping pressure oscillations induced by opening or closing the on/off valve.

5. A device according to claim 4, wherein the damping system comprises an open-pore porous material placed in the circuit in series with the on/off valve and in parallel with the proportional valve.

6. A device according to claim 4, wherein the damping system comprises a damper placed in a closed lateral branch of the circuit.

7. A microfluidic device according to claim 1, wherein the circuit comprises a first branch and a second branch located on either side of the tank, these two branches leading directly into the tank.

8. A microfluidic device according to claim 1, wherein the circuit comprises a first branch and a second branch located on either side of a junction between the circuit and the pipe leading to the tank.

9. A microfluidic device according to claim 7, wherein the first branch comprises the on/off valve and the proportional valve.

10. A microfluidic device according to claim 9, wherein the second branch comprises a narrowing formed by another proportional valve.

11. A microfluidic device according to claim 10, wherein the second branch comprises another on/off valve mounted in parallel with the narrowing.

12. A microfluidic device according to claim 1, wherein the first fluid is a liquid and the second fluid is a gas.

13. A microfluidic device according to claim 8, wherein the first branch comprises the on/off valve and the proportional valve.

14. A microfluidic device according to claim 1, wherein the maximum opening cross-section of the proportional valve is less than 5% of the maximum opening cross-section of the on/off valve.

15. A microfluidic device according to claim 8, wherein the first branch comprises the on/off valve and the proportional valve.

16. A microfluidic device according to claim 15, wherein the second branch comprises a narrowing formed by another proportional valve.

17. A microfluidic device according to claim 16, wherein the second branch comprises another on/off valve mounted in parallel with the narrowing.

* * * * *